(12) United States Patent
Nobrega (10) Patent No.: US 9,404,584 B2
(45) Date of Patent: Aug. 2, 2016

(54) COMPACT RESTICTIVE SEAL FOR BEARING HOUSINGS

(71) Applicant: PETROLEO BRASILEIRO S.A.-PETROBRAS, Rio de Janeiro (BR)

(72) Inventor: Paulo Roberto Leite Nobrega, Sao Vicente (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 169 days.

(21) Appl. No.: 14/157,729

(22) Filed: Jan. 17, 2014

(65) Prior Publication Data

US 2014/0219597 A1  Aug. 7, 2014

(30) Foreign Application Priority Data

Jan. 18, 2013 (BR) .................. 13 2013 001285-7

(51) Int. Cl.
*F16J 15/447* (2006.01)
(52) U.S. Cl.
CPC .................................. *F16J 15/4474* (2013.01)
(58) Field of Classification Search
CPC ... F16J 15/348; F16J 15/3444; F16J 15/4474; F16J 15/4487; F16J 15/164
See application file for complete search history.

(56) References Cited

U.S. PATENT DOCUMENTS

| 5,078,410 | A | * | 1/1992 | Warman | F16J 15/164 277/424 |
|---|---|---|---|---|---|
| 5,188,214 | A | * | 2/1993 | Uttke | B65G 39/09 198/501 |
| 7,427,070 | B2 | * | 9/2008 | Chitren | F16J 15/4478 277/347 |
| 7,878,508 | B2 | * | 2/2011 | Nobrega | F04D 29/106 277/352 |
| 8,201,830 | B2 | * | 6/2012 | Nobrega | F16J 15/3444 277/345 |
| 2007/0013142 | A1 | * | 1/2007 | Chitren | F16J 15/4478 277/411 |
| 2007/0194536 | A1 | * | 8/2007 | Nobrega | F16J 15/348 277/378 |
| 2009/0315271 | A1 | * | 12/2009 | Nobrega | F16J 15/348 277/348 |
| 2010/0219585 | A1 | * | 9/2010 | Roddis | F16J 15/4478 277/347 |
| 2010/0225065 | A1 | * | 9/2010 | Nobrega | F04D 29/106 277/418 |
| 2013/0033139 | A1 | * | 2/2013 | Tones | H02K 5/124 310/90 |

\* cited by examiner

*Primary Examiner* — Vishal Patel
(74) *Attorney, Agent, or Firm* — Sughrue Mion, PLLC (57) ABSTRACT

This certificate of addition pertains to alternative constructive methods submitted for the components of the seal, resulting in increased efficiency and durability of the device, as well as the ease of assembly thereof.
Compact restrictive seal (1) derived from these constructive alternatives can be applied indiscriminately to equipment lubricated by grease, fluid oil or oil mist.

15 Claims, 8 Drawing Sheets

COMPACT RESTICTIVE SEAL FOR BEARING HOUSINGS

FIELD OF THE INVENTION

This certificate of addition pertains to an improvement of the compact restrictive seal for bearing housings, for the purpose of increasing the efficiency of the device in severe conditions of exposure to lubricating oil and primarily to enable it to be applied in scenarios adopting oil mist as the means of lubrication.

Enhancements of the constructive configurations of some components are being proposed as alternatives to cope with the passive and active effects of sealing, increasing the efficiency of the labyrinth when subjected to various possible means of lubrication to be applied to equipment, particularly in extreme exposure conditions. Thus, the improvement directly affects the efficiency and functioning of the labyrinth in the various specific operating scenarios.

DESCRIPTION OF RELATED ART

The compact restrictive seal for bearing housings relates to a solution of the labyrinth in a "U" shape that primarily seeks to reduce or even eliminate the pumping of air through the protector, reducing air circulation through the bearing housing, in addition to the protections common to existing products in the market, such as the tightness against oil leakage from inside the bearing housing into the environment, as well as to prevent environmental contaminants from penetrating the bearing housing.

The aforementioned protector is also able to eliminate the need to use a press during assembly and adjusting its alignment is facilitated by an axial self-adjustment produced by the labyrinth's own body.

Thus, the invention relates to a labyrinth type protector for easy assembly and disassembly, equipped with a double inner and outer deflector system creating a "U" shape, a bi-functional labyrinth system and yet still continues to exhibit a finer thickness than similar products now on the market.

Two sectors of labyrinths, one operating with reference to the internal face of the bearing housing and the other to the outer face, also being designed, so that the fluid which would maintain contact with the body of the seal acquires a sufficient centrifugal force to also promote tightness, are among the solutions proposed to overcome the problems caused by these severe operating conditions.

As previously described in Application PI 0803690-0, the proposed solutions exhibiting this principle of centrifugal action as a barrier, make the labyrinth quite effective when subjected to severe operating scenarios and conditions.

The compact restrictive labyrinth for bearing housings of Application PI 0803690-0 is capable of being applied indiscriminately as a sealing element where lubrication is done with grease or oil in a liquid state; however, there is a method of lubrication that can still cause failures in the tightness offered by the proposed seal: oil mist lubrication.

In the mist lubrication system developed in Europe in 1930 by a bearing manufacturer, oil is sprayed in micro-particles and conveyed in an air flow up to the parts to be lubricated. Lubrication by misting yields excellent results in cases where very small amounts of oil are required, as it makes it relatively simple to apply the appropriate dosage of lubricant, depending on the needs of the parts to be lubricated.

Another important advantage of this method, deriving from the passage of the compressed air stream impregnated with oil through the lubricating parts, is that the constant flow of lubricant prevents the penetration or depositing of impurities inside the bearings, in addition to efficiently removing the generated heat.

Used in bearings that reach high speeds, it reduces the coefficient of friction by 25%, thus reducing the electrical power consumption of a motor by up to 5%.

As the industrial facilities of the oil industry have modernized, there has been a consequent trend towards applying this technology in its new projects, and they have also ended up gradually adopting this technology during repair maintenance at older industrial facilities.

The adoption of the new lubrication technology, both in new industrial facilities and older ones, exposed the need for seals that are also efficient in terms of oil mist propagation characteristics.

Oil mist lubrication is done by micro-particles of oil dispersed into the atmosphere inside of the bearing housing to be lubricated. These micro-particles are capable of easily passing through the protectors currently on the market, and end up contaminating the environment.

No matter how complex the labyrinth design may be, the spacing between fixed and rotating components will allow the passage of a stream of air. Since the inner atmosphere of the equipment is comprised of oil mist, it will be carried outside the unit, contaminating the environment.

Along with the problem of the tightness of the seal to the oil mist, it was also observed that the compact labyrinth for the bearing housings, proposed herein, could alternatively also be configured differently to better withstand the excessive exposure of their faces to the direct jets of oil on its inner face or direct and constant jet of water on its outer side.

Apart from all the above indicated circumstances, in terms of logistics, when it comes to adopting equipment lubricated by oil mist in an industrial facility that was originally fitted out with equipment adopting oil or grease type lubrication, it is necessary to put together a stock of seal models that can adequately handle the three types of lubrication. Or at least that one model of seal could simultaneously handle oil and grease lubrication and another resistant to oil mist.

This new need for organizing the stock entails new responsibilities in various sectors of the company, the old industrial facility of which gradually changed to equipment adopting oil mist as the means of lubrication.

The warehouse then has to more closely monitor two restrictive seal models in its inventory, one of which is increasingly more consumed, and the other increasing less.

As it is a mature industrial facility, with each replacement of old equipment for another new lubrication technology, the expectations of consumption of each seal stored in the warehouse continually changes, as well as the need for replacing its stock.

The negotiating power of the purchasing department is also compromised, due to the total quantity required of each item in each round of negotiations with the supplier, and the constant change in the anticipated consumption of the concerned item.

In view of all the above-described difficulties, and still within the scope of the present invention, it is proposed to change the centering ring and the constructive configuration of the labyrinths of the sleeve, housing and deflector, the main objective of all these changes being to enable a single labyrinth model to be applied to the grease or oil type, or even the oil mist type lubrication scenarios, either in standard operating scenarios or even in hostile scenarios.

BRIEF DESCRIPTION OF THE DRAWINGS

The alternative configuration of the invention to which this certificate of addition refers will be described below in further detail, together with the below listed drawings.

DETAILED DESCRIPTION OF THE INVENTION

Figure 1:
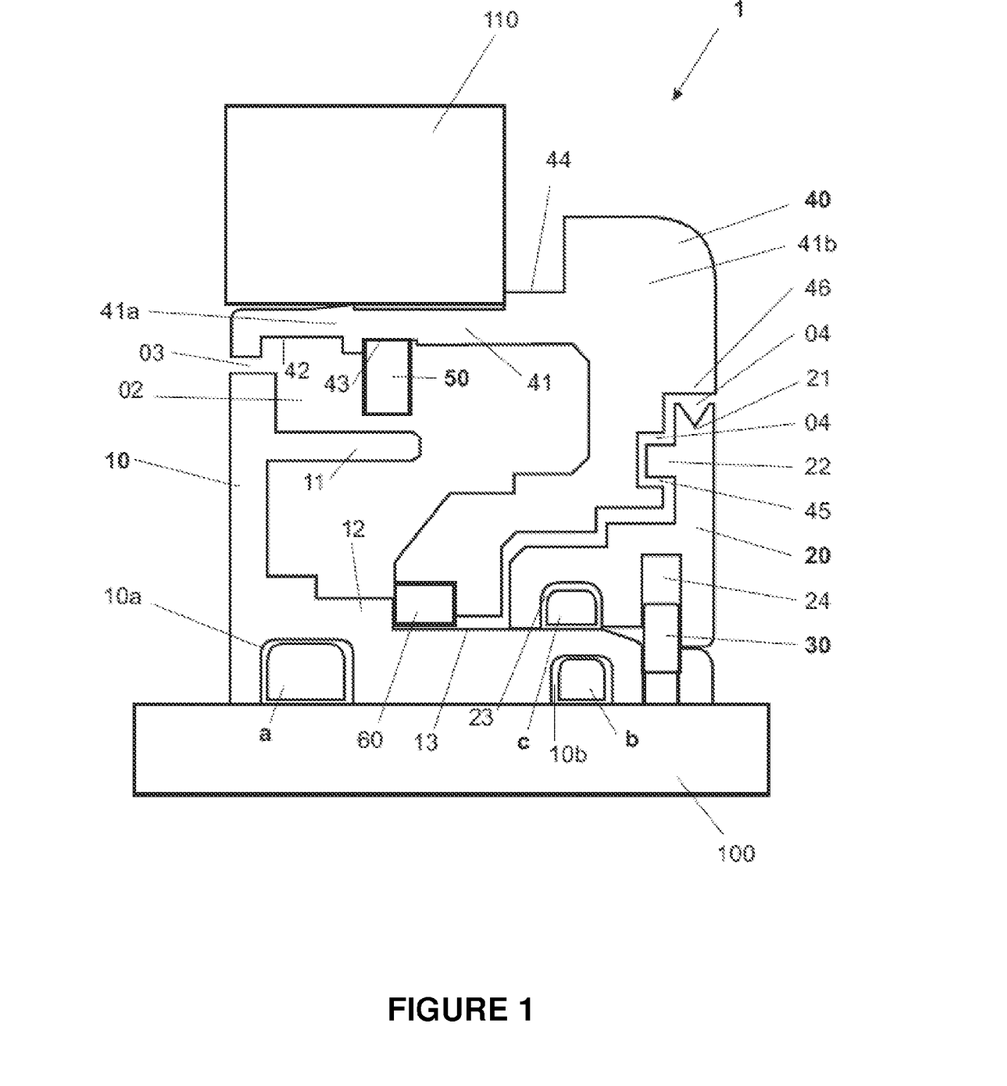
FIG. 1 depicts a sectional view of the upper section of the compact restrictive seal coupled to a shaft and a bearing housing.
Figure 2:
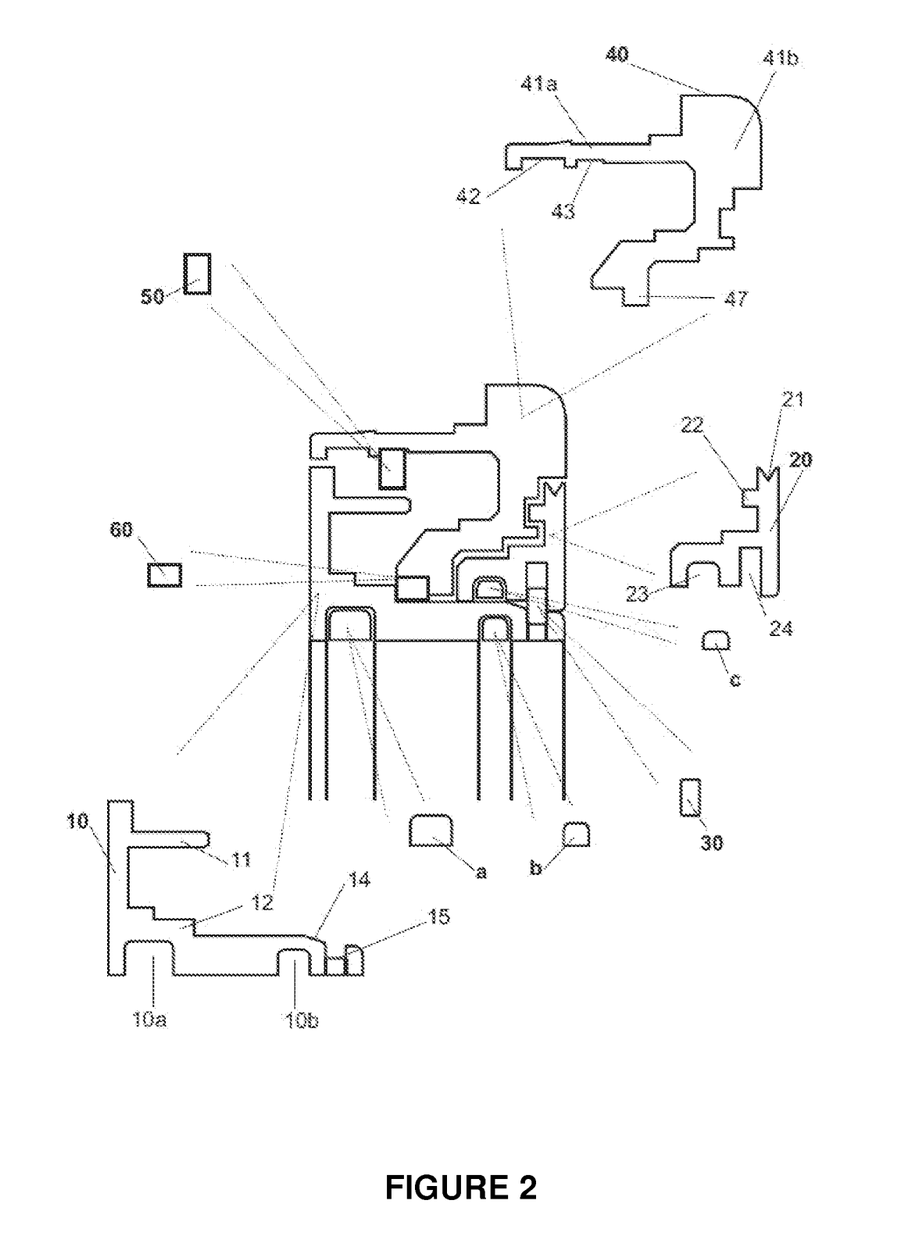
FIG. 2 is a simple sectional and exploded view of the top section of the components of the compact restrictive seal of FIG. 1.
Figure 3A:
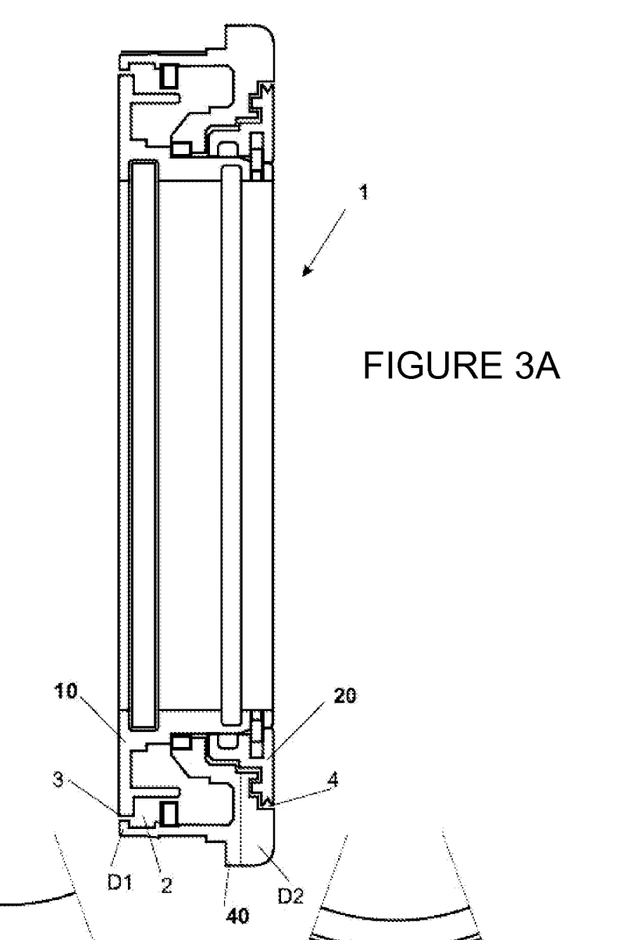
FIG. 3A shows a view in cross-section of the lower section of the compact restrictive seal.
Figure 3B:
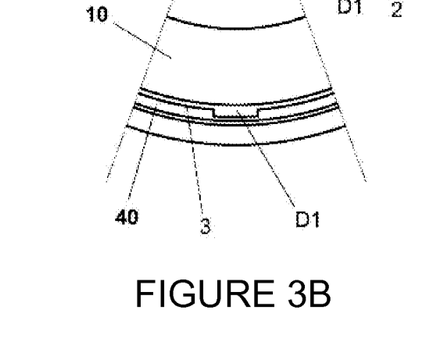
FIG. 3B shows a frontal internal view of the lower section of the compact restrictive seal of FIG. 3A.
Figure 3C:
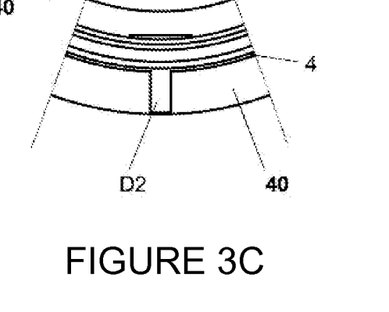
FIG. 3C shows a frontal external view of the lower section of the compact restrictive seal of FIG. 3A.

The constructive method covered by this certificate of addition will be described according to FIG. 1 and FIG. 2 provided in Application PI 0803690-0, which will be used as a basis for comparison and to better identify the aforementioned improvement.

Figure 4:
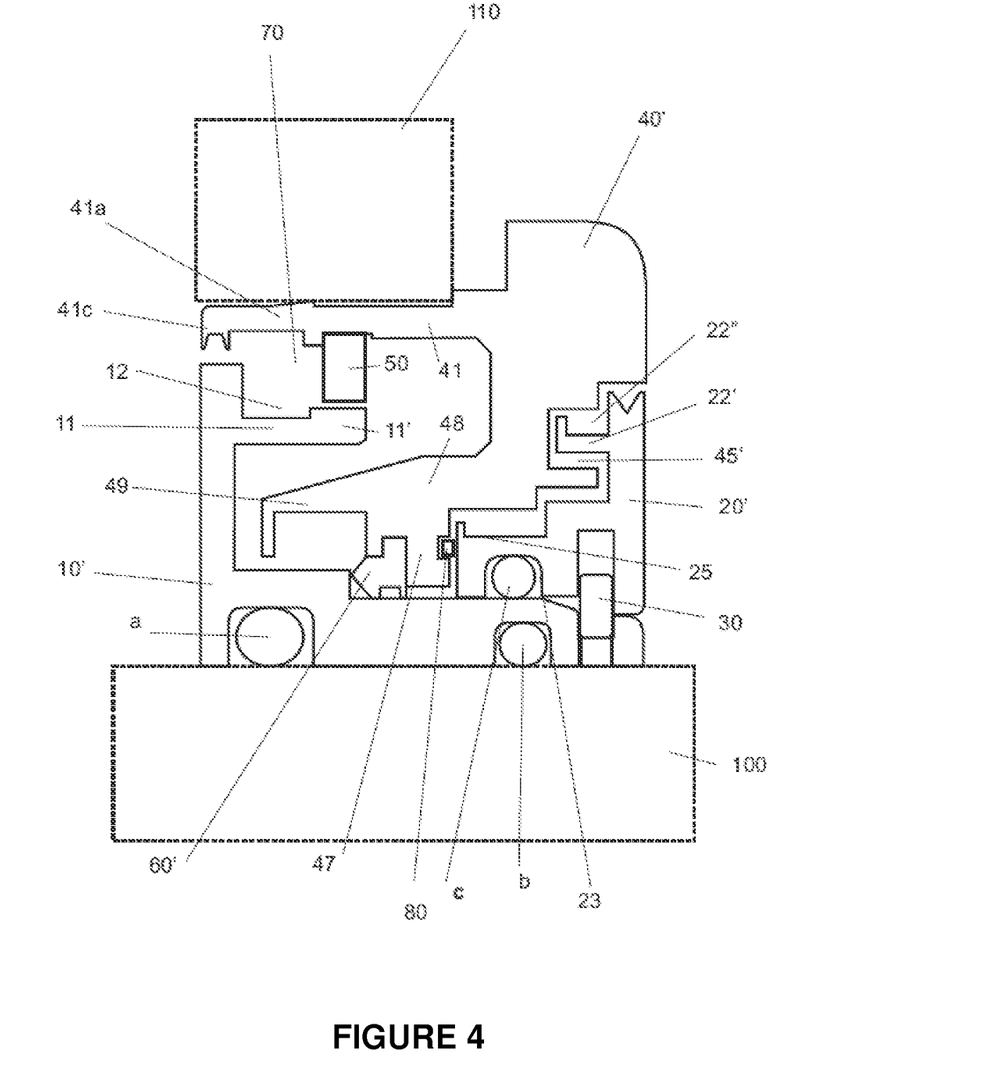
FIG. 4 depicts a sectional view of the upper section of the compact restrictive seal WITH THE IMPROVEMENT coupled to a shaft and a bearing housing.

FIG. 4 depicts in a sectional drawing the upper section of the IMPROVED compact restrictive seal, which can be easily compared to the equivalent FIG. 1. Therein is shown a typical schematic and sectional drawing of the compact restrictive seal (1) mounted on a shaft (100) coupled to a bearing housing (110).

Figure 5:
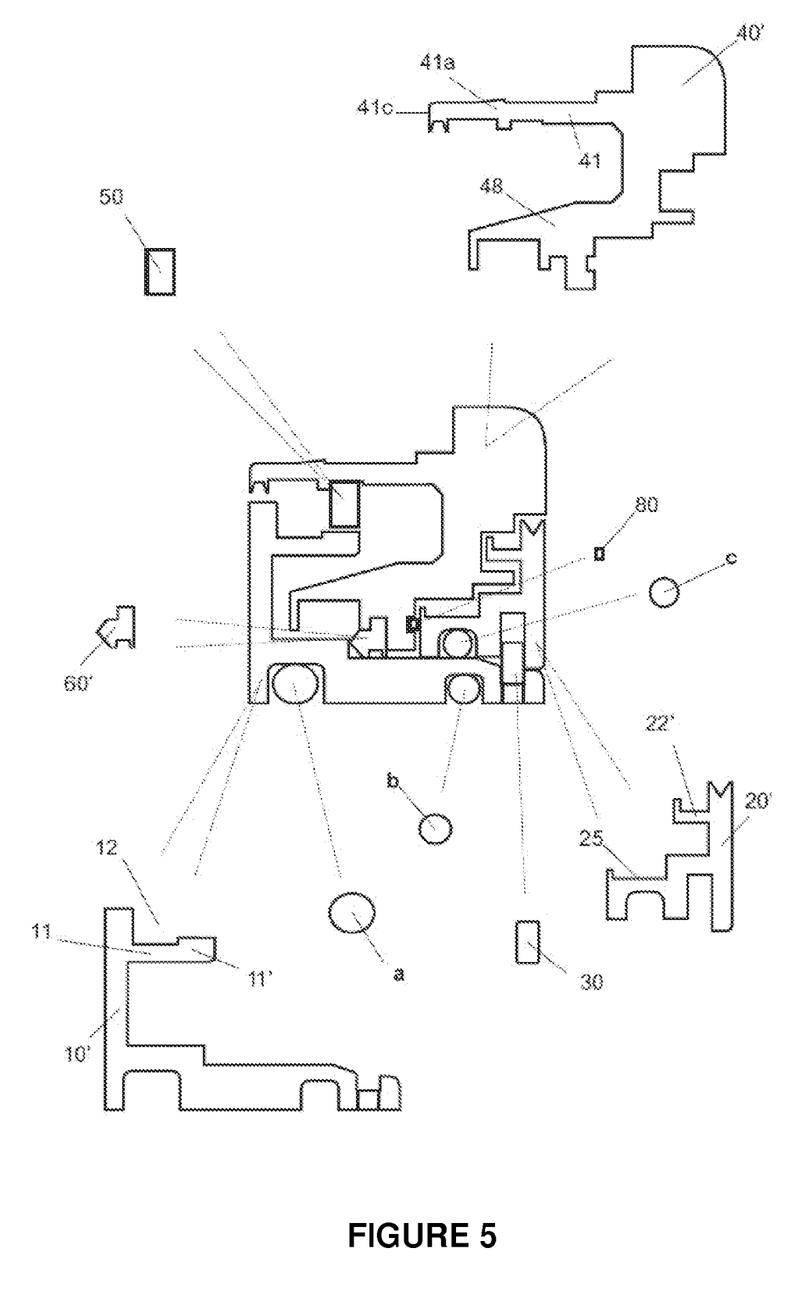
FIG. 5 is a simple sectional and exploded view of the top section of the components of the IMPROVED compact restrictive seal.

FIG. 5 portrays in exploded view the same components shown in FIG. 2, but with the alternative details proposed herein. In this view each component comprising the compact restrictive seal for bearing housings (1) can be identified, laid out according to the order of assembly, and said components essentially comprising:

a) A closed circular shaped sleeve (10') with a predominantly "J" shaped sectional profile that fits a shaft (not shown in this figure).

b) A closed circular shaped external deflector (20') with a predominantly "L" shaped sectional profile, which, due to the action of the sealing "O" ring (c), rotates in unison with the movement of the sleeve (10'), which in turn also rotates in unison with the axis (100).

c) An open circular shaped restrictive lock ring (30), with a predominantly polygonal shape sectional profile, preferably rectangular, and once assembled, connects the sleeve (10') to the external deflector (20').

In the opposite direction we have the following components, all in series with the fixed bearing housing (not shown in this figure), namely:

d) A closed circular shaped housing (40') with a predominantly "U" shaped sectional profile that is attached directly to the bearing housing (110).

e) An open circular shaped expanding lock ring (50) with a predominantly polygonal shaped sectional profile, preferably rectangular, that also serves as part of an internal labyrinth.

f) A closed circular shaped centering ring (60') with a predominantly "I" shaped sectional profile that is fixed in the central area of the smallest diameter of the housing (40').

A detailed description of the improvements proposed by this certificate of addition to each component of the compact restrictive seal (1) will be provided with the aid of FIGS. 4 and 5, so that its functions may be better understood.

The sleeve (10') exhibits the third smaller portion (11), parallel to shaft (100), which serves as part of an inner labyrinth, with a finish in the shape of a small tooth (11'). This small tooth (11') is aligned and turned in the direction of the expanding lock ring (50).

The aforementioned tooth (11') forms a channel (12) right from the end of the smaller portion (11). This improvement makes it possible to condense the mist and cause it to return to the inside of the housing, in addition to improving the uptake of oil, thus improving efficiency.

External deflector (20') reveals a more extensive tooth (22'), in order to go deeper into the housing body (40'). Tooth (22') is provided with a finish on its end, such that its outer face resembles a channel with a trough (22") oriented towards the same operating direction as the centrifugal force.

This improvement enables the impounding of the water droplets to return them outside the labyrinth, protecting the equipment, and thus improving efficiency against strong spurts of outside water.

The body of the outer deflector (20') is opposite to the internal channel (23), which houses the sealing "O" ring (c), a secondary channel (25).

This improvement acts as a reinforcement of the barrier action exerted by the trough (22"). It impounds the water droplets that could overrun the first barrier, causing it to return back outside of the labyrinth ensuring the protection of the bearing housing, and improving its efficiency against the strong and constant gush of outside water.

The housing (40') continues to exhibit an upper portion (41) subdivided into two sections with the same specific functions initially explained in Application PI 0803690-0. However, end (41c) of first section (41a), which is completely under the projection of the bearing housing wall, is now in the shape of a "V" tooth.

Said "V" tooth shaped end (41c) in combination with the expanding lock ring (50) and the channel (12) forms a holding chamber (70), which acts as a first barrier against oil or oil mist.

The vertical portion of housing (40') is provided with a shape that mirrors the inner face of outer deflector (20') and main channel (45') is now deeper to accommodate tooth (22').

Lower portion (48) is now more extensive than the main constructive configuration presented in Application PI 0803690-0, revealing an appendage (49) downstream of the notched cavity (47), which houses the centering ring (60'). The aforementioned appendage (49) is in the shape of a channel, and acts in three different ways.

Initially it acts as a shield against direct access by oil particles onto the centering ring (60'). In a second aspect, it contributes to collecting internal oil in applications in which large volumes of oily fluid fall on seal (1). And finally, when the bearing housing is lubricated by oil mist, appendage (49) induces a reduction of turbulence within the oil mist restricting seal (1), which also improves the action of the centering ring (60'.)

In addition, in the lower portion (48) of the housing (40') and behind the toothed cavity (47), at least three inserts (47') are provided, distributed equally along the perimeter. The aforementioned insertions (47') are fitted with spacers (80), preferably made of an easily wearing material, which ensure the gap between the deflector (20') and the housing (40'). These spacers (80) also serve as a shield for the outer deflector (20') at the time of assembly of the seal (1) into the equipment.

As for centering ring (60'), it now has the shape of an "I" lying down.

Figure 6:
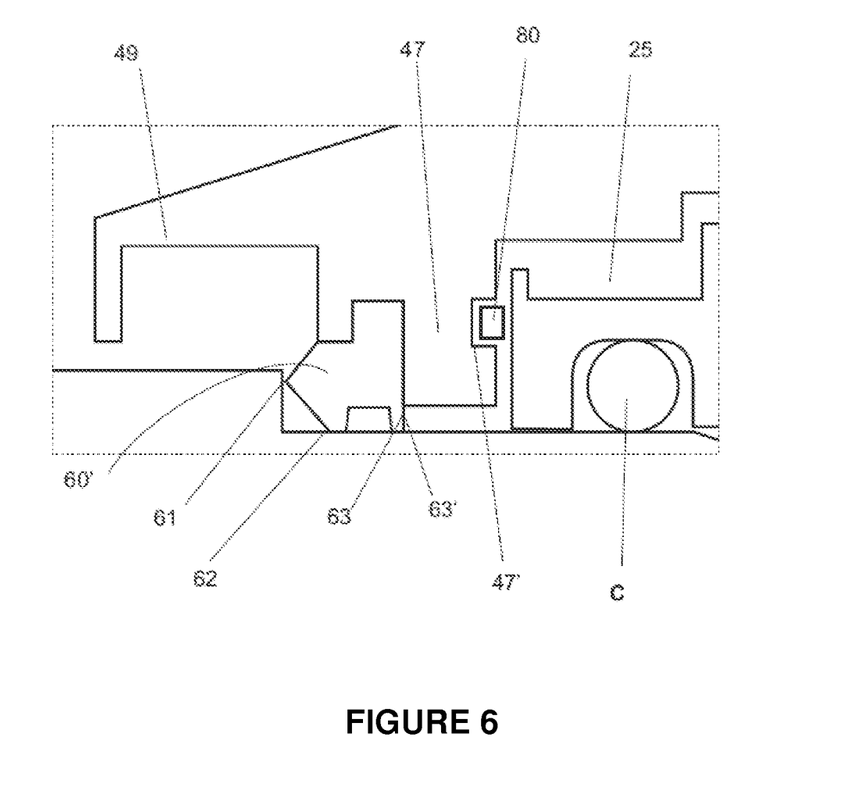
FIG. 6 depicts a cut-away view of the upper section of the compact restrictive seal showing the centering ring in detail.

FIG. 6 shows the aforementioned centering ring (60') sectionally and its operating area in enlarged detail. This figure makes it possible to perceive the peculiar shape of this component, so that the compact restrictive seal (1) is virtually impermeable to leakage of oil mist into the atmosphere inside the equipment.

In this constructive alternative, the contact area of the centering ring (60') with the sleeve (10') has been reduced, now exhibiting three thin contact areas, namely: (61), (62) and (63').

The wedge-shaped centering ring (60') facilitates the fitting during assembly of the housing (40') onto the sleeve (10'). After assembly, as done with the centering ring (60), the contact areas (61) and (62) undergo an adaptation wearing through the relative movement of the sleeve (10') in relation to the housing (40') of the restrictive seal (1), eliminating any remaining friction, and leaving said components free.

The third contact area (63') is provided by a lip (63). This lip (63) has an initial length such that, after the wear sustained by the initial rotations between the components of the restrictive seal (1), there continues to be a gap (f) less than the radial gap of the housing (40') on the sleeve (10'). This gap (f) has been reduced enough to block the micro-particles of the oil mist.

This contact area (63'), though thin, is responsible for the sealing mist, and represents a major technological breakthrough due to its efficiency, reliability and simplicity.

Thus, the centering ring (60') has three functions: to center the rotor assembly through the contact area (62); to axially position the rotor relative to the housing (40'); and to reduce the radial gap between the rotating and stationary part to the minimum, thus blocking the passage of air and oil mist.

The toothed cavity (47) in this constructive alternative exhibits a shape reflecting the section of the centering ring (60'), so as to improve its attachment to the housing body (40').

The configuration of two deflectors, as proposed in this constructive alternative, one being external (20') and the other internal, formed by the vertical part of sleeve (10'), gives the restrictive seal (1) a "U" shape in the rotating component. This causes the air pumping and drawing capacity of both sides to be balanced.

If the axis of the equipment is shifted slightly axially during operation, there may be a slight imbalance in the air drag by the deflectors, but it will be offset by the restriction created by the contact area (63'). Thus, the action of the two deflectors plus the restriction of the contact area (63') enables the restrictive seal (1), in addition to its normal functions of preventing the escape of oil and entry of contaminants, also to have the advantage of preventing the circulation of air through the component.

Figure 7:
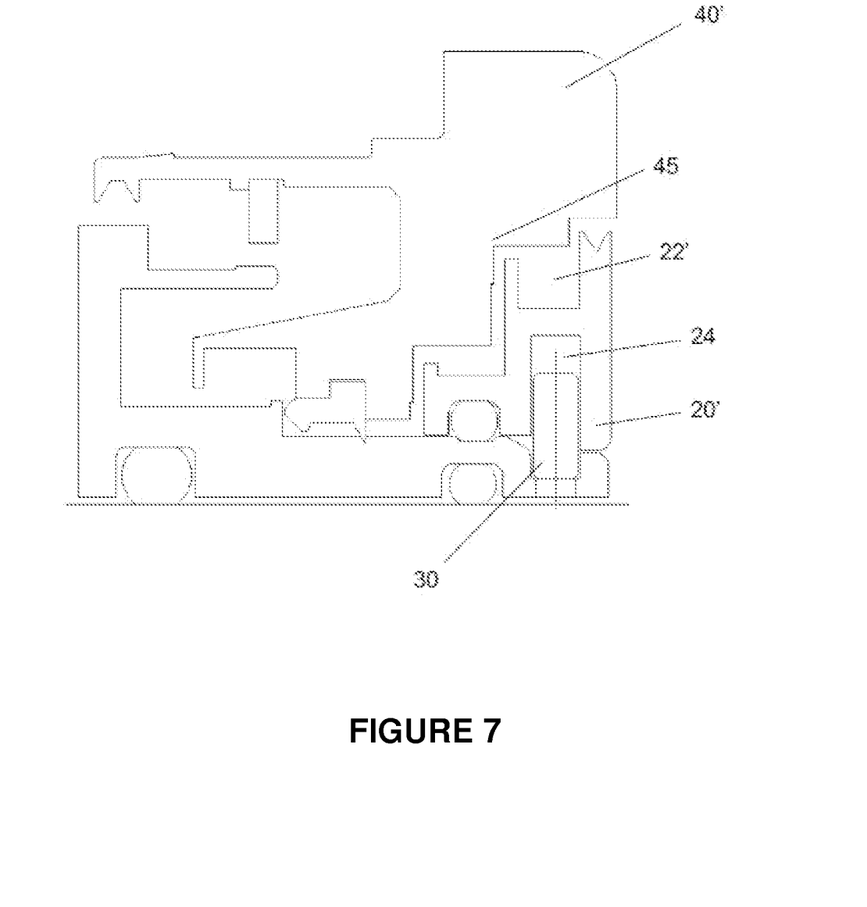
FIG. 7 depicts a cut-away view of the upper section of the compact restrictive seal showing a first constructive alternative of the outer deflector.

FIG. 7 shows a first constructive alternative basically applied in the form of the housing body (40') in whatever configuration is adopted by the other components. The proposed constructive alternative seeks to accommodate a scenario where the external conditions are very severe.

As may be easily seen through FIG. 7, the housing body (40') no longer consists of a main channel (45'), giving rise to only one indented formation (45"), the space of which is completely filled by the trough (22"). The depth of the trough (22") in this configuration spans a greater volume, at the bridge of its base directly opposing the bottom of the outermost channel (24), the size of which has also increased.

Thus the body of the outer deflector (20) or (20') now exhibits an increased trough (22"), giving it greater capacity for holding liquid coming from the environment, and improves the external labyrinth function without detracting from the U concept. Another concomitant advantage is that this configuration allows the use of a higher restrictive lock ring (30), increasing the resistance to centrifugal force and allowing its use at higher rotating speeds.

Figure 8:
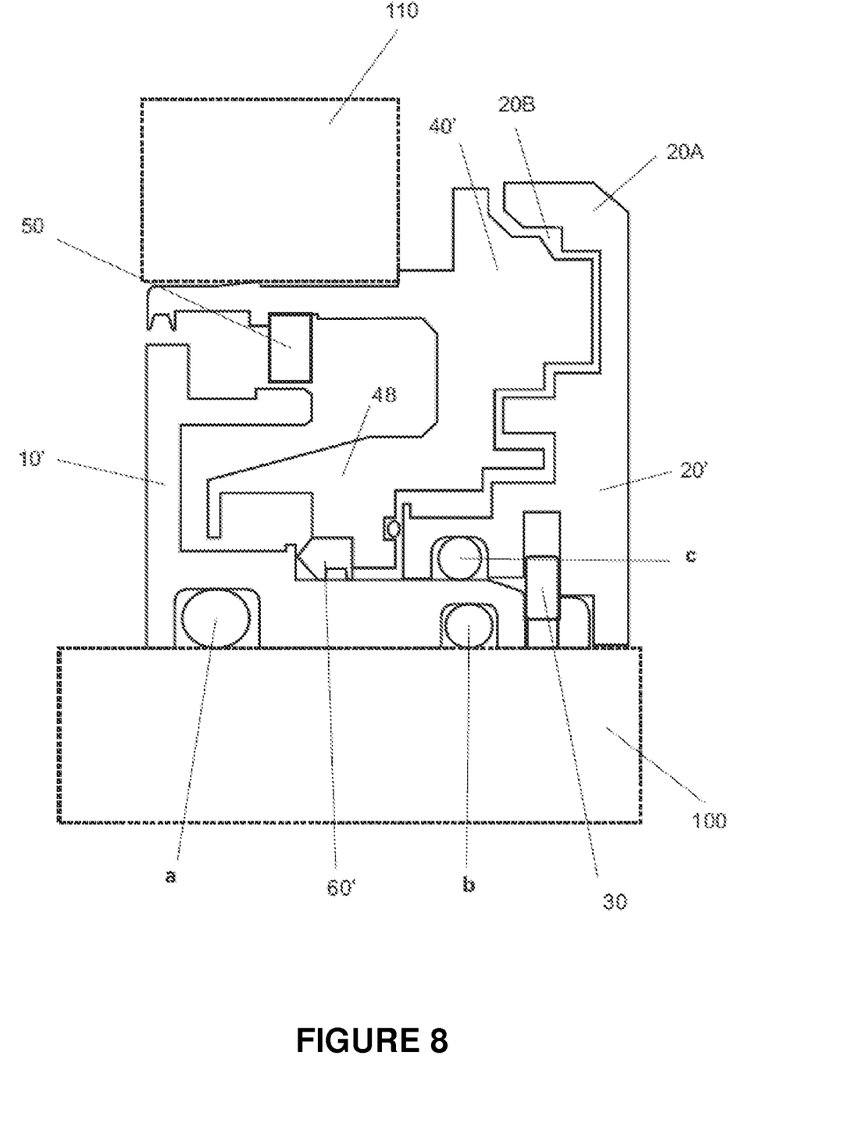
FIG. 8 depicts a cut-away view of the upper section of the compact restrictive seal showing a second constructive alternative of the outer deflector.

FIG. 8 shows a second constructive alternative applicable only for the form of the external deflector (20'), in whatever configuration is adopted by the other components. The proposed constructive alternative seeks to accommodate a specific scenario in which the bearing housing or equipment operates with its axis in the vertical direction, more specifically, in applications such as cooling towers.

As may be readily appreciated from FIG. 8, the outside wall of the external deflector (20) or (20') is extended until it matches the outside diameter of the housing (40) or (40').

The body of the external deflector (20) or (20') now exhibits an outer wall (20A), in which the inner face is equipped with a labyrinth (20B) rising towards the housing (40) or (40').

Thus, the vertical restrictive seal (1) can be safely applied in cooling towers, since the dimensional expansion of the outer wall (20A) of the external deflector (20) or (20') forms a bonnet over the labyrinth (20B), preventing the penetration of rainwater or spills.

The constructive changes introduced into the object of the present invention represent an increase in its efficiency and durability, but above all it allows the same compact restrictive seal (1) to be used in equipment lubricated by grease, liquid oil or oil mist.

Based on the above detailed description, it should be apparent that the compact restrictive seal (1) continues to ensure the originally designed tightness both against outside weather and for efficient internal lubrication. However, it increases the applicability of the same seal, particularly for multiple methods of lubrication.

The certificate of addition was described herein with reference to its preferred embodiments. It should, however, be clarified that the invention is not limited to these embodiments, and those skilled in the art will readily understand that modifications and substitutions can be made within the inventive concept described herein.

The invention claimed is:

1. Compact restrictive seal for bearing housings, comprising a closed circular shaped sleeve (10') with a predominantly "J" shaped sectional profile that fits a shaft; a closed circular shaped external deflector (20') with a predominantly "L" shaped sectional profile; an open circular shaped restrictive lock ring (30) with a predominantly polygonal shaped sectional profile; a closed circular shaped housing (40'); an open circular shaped expanding lock ring (50) with a predominantly polygonal shaped sectional profile; a closed circular shaped centering ring (60') that is fixed in the central area of the smallest diameter of housing (40'), and is additionally characterized in that the sleeve (10') exhibits the third smaller portion (11), parallel to the shaft (100), which serves as part of an inner labyrinth, with a finish in the shape of a small tooth (11'); this small tooth (11') is to be aligned and oriented towards the expanding lock ring (50); the aforementioned tooth (11') also forms a channel (12) right from the end of the smaller portion (11); the external deflector (20') is to be equipped with a more extensive tooth (22'), in order to go deeper into the housing body (40'); the aforementioned tooth (22') in turn, is to be provided with a finish on its end, such that its outer face resembles a channel with its trough (22") oriented towards the same operating direction as the centrifugal force; the body of the outer deflector (20') is to be opposite the internal channel (23), which houses the sealing "O" ring (c), a secondary channel (25); the closed circular shaped housing (40') has a predominantly "U" shaped sectional profile; the end (41*c*) of upper portion (41*a*) of housing (40'), which is completely under the projection of the bearing housing wall, has the shape of a "V" tooth; said "V" tooth shaped end (4*k*) in combination with the expanding lock ring (50) and the channel (12) form a holding chamber (70); the vertical portion of the housing (40') is to be given a shape that mirrors the inner face of the outer deflector (20') and the main channel (45') is to be deeper to accommodate the tooth (22'); the lower portion (48) of housing (40') is to reveal an appendage (49) downstream of the notched cavity (47), which houses the centering ring (60'); the aforementioned appendage (49) is to be in the shape of a channel; the centering ring (60') is to be in the shape of an "I" lying down and with contact area with the sleeve (10'), now exhibiting three thin contact areas, (61), (62) and (63'), wherein a wedge shape forms two of the three thin contact areas and a lip forms a third of the three thin contact areas.

2. Compact restrictive seal for bearing housings, according to claim 1, wherein the holding chamber (70) acts as a first barrier against liquid oil or oil mist.

3. Compact restrictive seal for bearing housings, according to claim 1, wherein the appendage (49) acts as a shield against the direct access by oil particles onto the centering ring (60').

4. Compact restrictive seal for bearing housings, according to claim 1, wherein appendage (49) contributes to collecting internal oil in applications in which large volumes of oily fluid occur over seal (1).

5. Compact restrictive seal for bearing housings, according to claim 1, wherein appendage (49) induces a reduction of turbulence within the oil mist restricting seal (1).

6. Compact restrictive seal for bearing housings, according to claim 1, wherein contact areas (61) and (62) of centering ring (60') undergo an adaptation wearing through the relative movement of the sleeve (10') in relation to the housing (40') of the restrictive seal (1), eliminating any remaining friction, and leaving said components free following the first operation.

7. Compact restrictive seal for bearing housings, according to claim 1, wherein the lip (63) has an initial length such that, after the wear sustained by the initial rotations between the components of the restrictive seal (1), there continues to be a gap (f) less than the radial gap of housing (40') on the sleeve (10').

8. Compact restrictive seal for bearing housings, according to claim 1, wherein the centering ring (60') is to exhibit three different functions: to center the rotor assembly through contact area (62); to axially position the rotor relative to the housing (40') and to reduce the radial gap between the rotating and stationary part to the minimum.

9. Compact restrictive seal for bearing housings, according to claim 1, wherein the toothed cavity (47) is to exhibit a shape reflecting the section of the centering ring (60'), so as to improve its attachment to the housing body (40').

10. Compact restrictive seal for bearing housings, according to claim 1, wherein the lip (63) has an initial length such that, after the wear sustained by the initial rotations between the components of the restrictive seal (1), there continues to be a gap (f) less than the radial gap of the housing (40') on the sleeve (10').

11. Compact restrictive seal for bearing housings, according to claim 1, wherein the body of the housing (40') is to be alternatively shaped only by an indented formation (45"), the space of which is completely filled by trough (22'); the depth of said trough (22"), in this configuration, covering a larger volume, the point of its base directly opposing the outermost bottom channel (24), the size of which has also increased.

12. Compact restrictive seal for bearing housings, according to claim 1, wherein the outside wall of the external deflector (20) or (20') is, alternatively, to be extended until it matches the outside diameter of the housing (40) or (40'), now exhibiting an outer wall (20A) in which the inner face is equipped with a labyrinth (20B) rising towards the housing (40) or (40') and has the shape of a bonnet over the labyrinth (20B).

13. Compact restrictive seal for bearing housings, according to claim 1, wherein the lower portion (48) of the housing (40'), behind the toothed cavity (47), is to be provided with at least three inserts (47'), distributed equally along the perimeter and said inserts (47') are to be fitted with spacers (80).

14. Compact restrictive seal for bearing housings, according to claim 1, wherein said spacers (80) ensure the gap between the deflector (20') and the housing (40').

15. Compact restrictive seal for bearing housings, according to claim 1, wherein the aforementioned spacers (80) are to be made of an easily wearing material.

\* \* \* \* \*